United States Patent
Srivivasan et al.

(10) Patent No.: US 8,625,411 B2
(45) Date of Patent: Jan. 7, 2014

(54) ROBUST MESH TRANSPORT NETWORK COMPRISING CONJOINED RINGS

(75) Inventors: Santhanam Srivivasan, Holmdel, NJ (US); Sasisekharan Raguram, Hillsborough, NJ (US); Pradeep Shrikrishna Limaye, Westfield, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 2745 days.

(21) Appl. No.: 10/284,619

(22) Filed: Oct. 31, 2002

(65) Prior Publication Data

US 2003/0063617 A1 Apr. 3, 2003

Related U.S. Application Data

(63) Continuation-in-part of application No. 09/909,550, filed on Jul. 20, 2001, now Pat. No. 7,161,899, and a continuation-in-part of application No. 09/969,703, filed on Oct. 3, 2001, now abandoned.

(51) Int. Cl.
*G06F 11/00* (2006.01)

(52) U.S. Cl.
USPC ........ 370/223; 370/241.1; 370/242; 370/247; 370/248; 370/249; 370/251

(58) Field of Classification Search
USPC .................................. 370/216, 222, 223, 224
See application file for complete search history.

(56) References Cited

U.S. PATENT DOCUMENTS

| | | | |
|---|---|---|---|
| 5,406,549 A * | 4/1995 | Kremer | 370/224 |
| 6,262,820 B1 * | 7/2001 | Al-Salameh | 398/12 |
| 2002/0141334 A1 * | 10/2002 | Deboer et al. | 370/227 |

OTHER PUBLICATIONS

W.D. Grover, D. Stamatelakis, "Bridging the ring-mesh dichotomy with p-cycles," Proceedings of the Design of Reliable Communications Networks (DRCN 2000), Technical University of Munich, Apr. 9-12, 200, Session 5.
W.D. Grover, D. Stamatelakis, "Cycle-Oriented Distributed Preconfiguration: Ring-like Speed with Mesh-like Capacity for Self-Planning Network Restoration," Proceedings of IEEE ICC '98, Atlanta, Jun. 7-11, 1998, pp. 537-543.

* cited by examiner

*Primary Examiner* — Alvin Zhu

(57) ABSTRACT

A mesh network architecture is disclosed whose protected services can be restored quickly after the failure of a network element (i.e., a network node, a network transmission facility). Furthermore, the protected services can be restored after all single and most multiple network-element failures as quickly as a ring network can recover from a single network-element failure. And still furthermore, the illustrative embodiment is also advantageous in that it can be administered and maintained, for most purposes, as a collection of distinct ring networks. Embodiments of the present invention can use any protocol or transmission technology (e.g., wavelength division multiplexing, SONET/SDH, ATM, etc.). Furthermore, embodiments of the present invention distinguish between the transport function, the provisioning function, and the fault notification functions of a network and provide that each of the functions can be accomplished by different networks using different protocols.

1 Claim, 8 Drawing Sheets

ROBUST MESH TRANSPORT NETWORK COMPRISING CONJOINED RINGS

CROSS-REFERENCE TO RELATED APPLICATIONS

This application is a continuation-in-part of U.S. patent application Ser. No. 09/909,550, filed Jul. 20, 2001, and entitled "Interlocking SONET/SDH Network Architecture," issued as U.S. Pat. No. 7,161,899, and also a continuation-in-part of U.S. patent application Ser. No. 09/969,703, filed Oct. 3, 2001, now abandoned and entitled "Fault-Tolerant Mesh Network Comprising Interlocking Ring Networks." Both of these applications are incorporated by reference.

FIELD OF THE INVENTION

The present invention relates to telecommunications in general, and, more particularly, to fault-tolerant mesh networks.

BACKGROUND OF THE INVENTION

Telecommunications networks in a mesh topology offer many advantages over networks that are restricted to a ring topology. A mesh topology is disadvantageous, however, in that existing mechanisms for the restoration of mesh networks after failure are complex, particularly so after the failure of multiple network elements. Therefore, the need exists for a mesh network architecture that is faster to restore in the event of the failure of a network element.

SUMMARY OF THE INVENTION

The present invention provides a mesh network architecture that avoids some of the costs and disadvantages associated with mesh network architectures in the prior art.

For example, the illustrative embodiment is a mesh network whose protected services can be restored quickly after the failure of a network element (i.e., a network node, a network transmission facility). Furthermore, the protected services can be restored after all single and most multiple network-element failures as quickly as a ring network can recover from a single network-element failure. And still furthermore, the illustrative embodiment is also advantageous in that it can be administered and maintained, for most purposes, as a collection of distinct ring networks. This is beneficial because ring networks are easy to administer and maintain and also because most network service providers are already familiar with administering and maintaining ring networks.

Embodiments of the present invention can use any protocol or transmission technology (e.g., wavelength division multiplexing, dense wavelength division multiplexing, SONET/SDH, ATM, etc.). Furthermore, embodiments of the present invention distinguish between the transport function, the provisioning function, and the fault notification functions of a network and provide that each of these functions can be accomplished by the same or by different sub-networks using different protocols.

The illustrative embodiment of the present invention is a telecommunications system that comprises: a mesh transport network that comprises a plurality of nodes and a plurality of communications links, wherein said mesh transport network defines a first address space, wherein each of said plurality of nodes has a unique address in said first address space and a unique address in at least one ring network, and wherein each of said plurality of communications links is associated with at least one ring network; and a provisioning network that is logically distinct from said mesh transport network for controlling said plurality of nodes.

DETAILED DESCRIPTION

Figure 1:
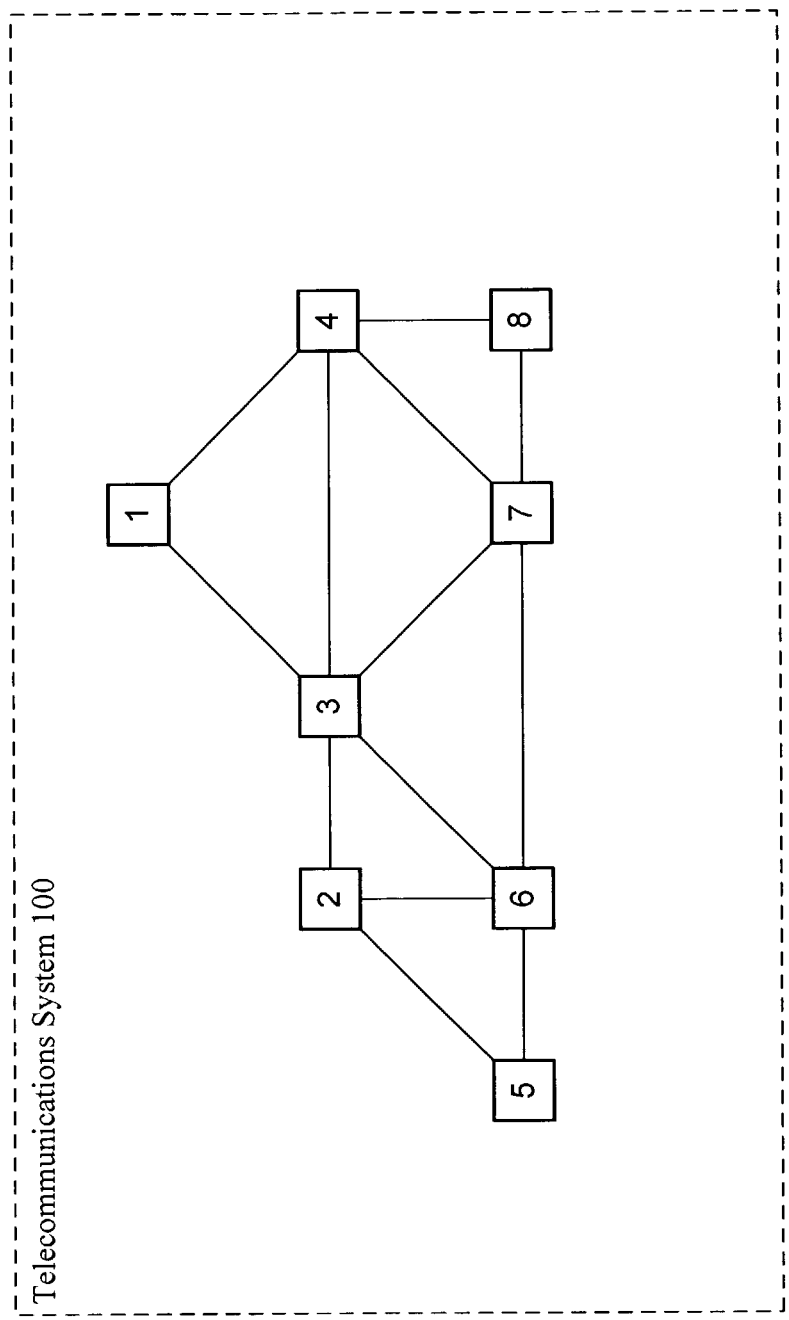
FIG. 1 depicts a graph of the topology of the germane physical facilities that compose the illustrative embodiment of the present invention.

FIG. 1 depicts a graph of the topology of the germane physical facilities that compose the illustrative embodiment of the present invention. As depicted in FIG. 1, telecommunications network 100 comprises 8 physical nodes and 13 physical communications links, interconnected as shown. A line between two nodes in FIG. 1 indicates that there exists a physical communication link between those nodes. Although there is not a direct physical communications link between each pair of nodes, there is at least one physical path (i.e., series of physical communications links) between each pair of nodes. Although the illustrative embodiment comprises 8 physical nodes, it will be clear to those skilled in the art, after reading this specification, how to make and use embodiments of the present invention that comprise any number of physical nodes.

For the purposes of this specification, a "node" is defined as comprising:
 i. a switch, or
 ii. a time-slot interchanger, or
 iii. a cross-connect, or
 iv. a multiplexor, or
 v. a demultiplexor, or
 vi. any combination of i, ii, iii, iv, and v.

As is described in detail below, each physical node in telecommunications network 100 can comprise one or more logical nodes. For the purposes of this specification, a "logical node" is defined as a node in a logical network. For the purposes of this specification, a "logical network" is defined as an apparently distinct, isolated, or virtual network.

Although the illustrative embodiment comprises 13 physical communications links, it will be clear to those skilled in the art, after reading this specification, how to make and use embodiments of the present invention that comprise any number of physical telecommunications links. For the purposes of this specification, a "communications link" is defined as comprising:
 i. one or more unidirectional physical telecommunications channels, or ii. one or more bi-directional physical telecommunications channels, or iii. any combination of i and ii.

Furthermore, each communications link can be a wireline or wireless or combination wireline and wireless link. And still furthermore, each communications link can comprise a point-to-point or point-to-multipoint (i.e., broadcast) protocol, and each communications link can comprise a dedicated-bandwidth medium or a shared-bandwidth medium. And yet still furthermore, each communications link can comprise one or more logical channels, as is described below in detail.

Telecommunications network 100 comprises the physical topology depicted in FIG. 1, which is a mesh network whose topology is chosen to facilitate an understanding of the present invention. It will be clear to those skilled in the art, after reading this specification, how to make and use embodiments of the present invention that have any topology.

In accordance with the illustrative embodiment, telecommunications network 100 comprises three independent, but interrelated, logical networks:

i. transport network 100-1, ii. provisioning network 100-2, and iii. fault notification network 100-3.

Figure 5:
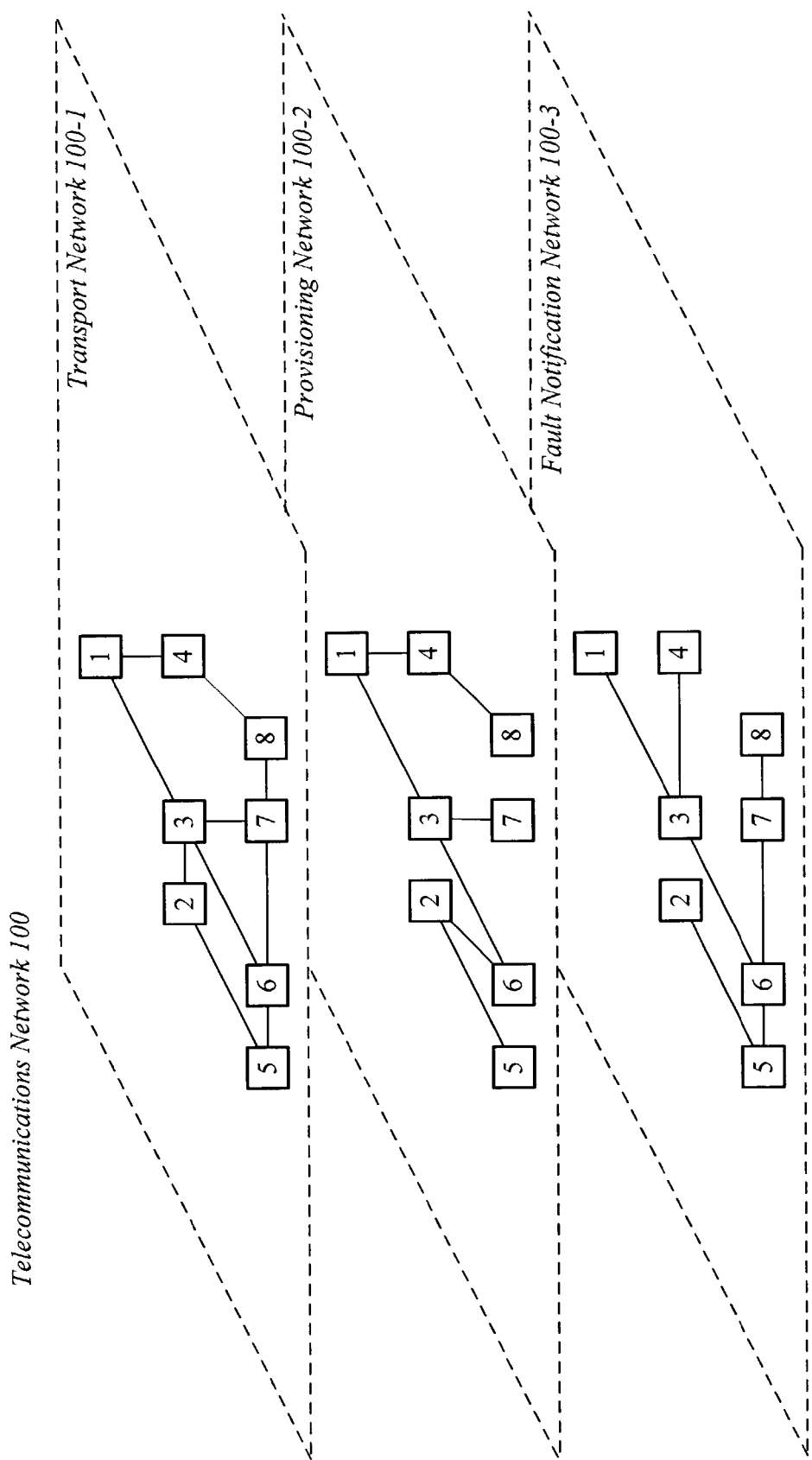
FIG. 5 depicts a drawing that superimposes the transport network, the provisioning network, and the fault notification network on each other as different logical planes.

Each of transport network 100-1, provisioning network 100-2, and fault notification network 100-3 comprises a non-empty subset of telecommunications network 100. Another way of conceptualizing the relationship of transport network 100-1, provisioning network 100-2, and fault notification network 100-3 to telecommunications network 100 is to envision each of transport network 100-1, provisioning network 100-2, and fault notification network 100-3 as superimposed planes, as depicted in FIG. 5, which in total compose telecommunications network 100.

Each of transport network 100-1, provisioning network 100-2, and fault notification network 100-3 are responsible for performing a different objective with regard to telecommunications network 100.

Transport network 100-1 is the raison d'être for telecommunications network. In other words, transport network 100-1 is the reason that telecommunications network 100 exists because it is transport network 100-1 that transports end-user or payload traffic from one node to another. If there were no transport network, telecommunications network 100 would have no practical reason for existing.

Figure 2:
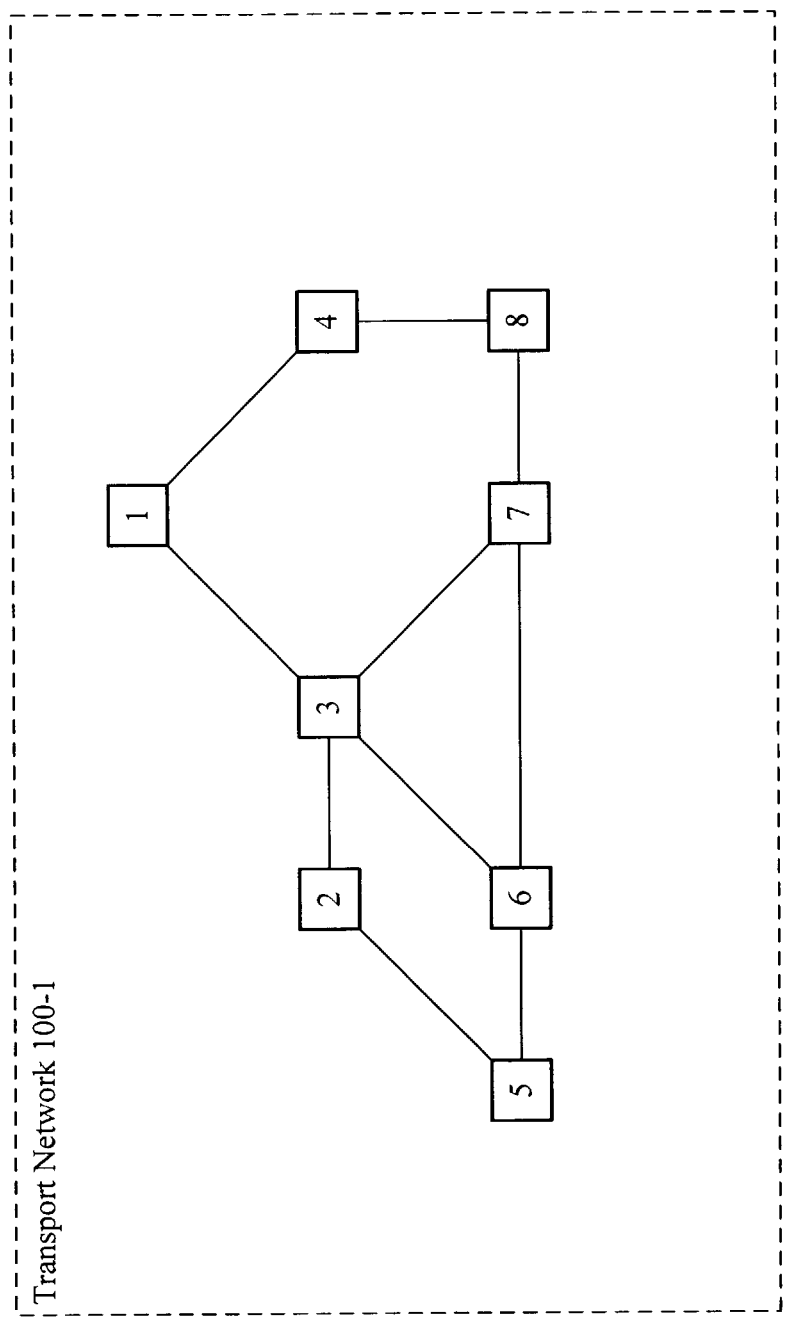
FIG. 2 depicts a graph of the topology of the transport network in accordance with the illustrative embodiment.

In accordance with the illustrative embodiment, transport network 100-1 has a logical node at each physical node in telecommunications network 100. The topology of transport network 100-1 is depicted in FIG. 2.

Some of the physical links in telecommunications network 100 are not logical links in transport network 100-1 purely for pedagogical purposes to illustrate that not all of the links in telecommunications network 100 need also be in transport network 100-1. Although transport network 100-1 comprises 8 nodes in the topology depicted, it will he dear to those skilled in the art, after reading this specification, how to make and use embodiments of the present invention in which the transport network comprises a different number of nodes in any topology.

In accordance with the illustrative embodiment, transport network 100-1 uses a synchronous time-division multiplexed protocol (e.g., T1, SONET/SDH, ISDN, etc.) to transmit end-user traffic from one node in the transport network to the next. It will be clear to those skilled in the art, however, after reading this specification, how to make and use embodiments of the present invention that use other protocols (e.g., asynchronous transfer mode, wavelength division multiplexing, dense wavelength-division multiplexing, frequency-division multiplexing, code-division multiplexing, etc.) to transmit end-user traffic from one node in the transport network to another.

Figure 3:
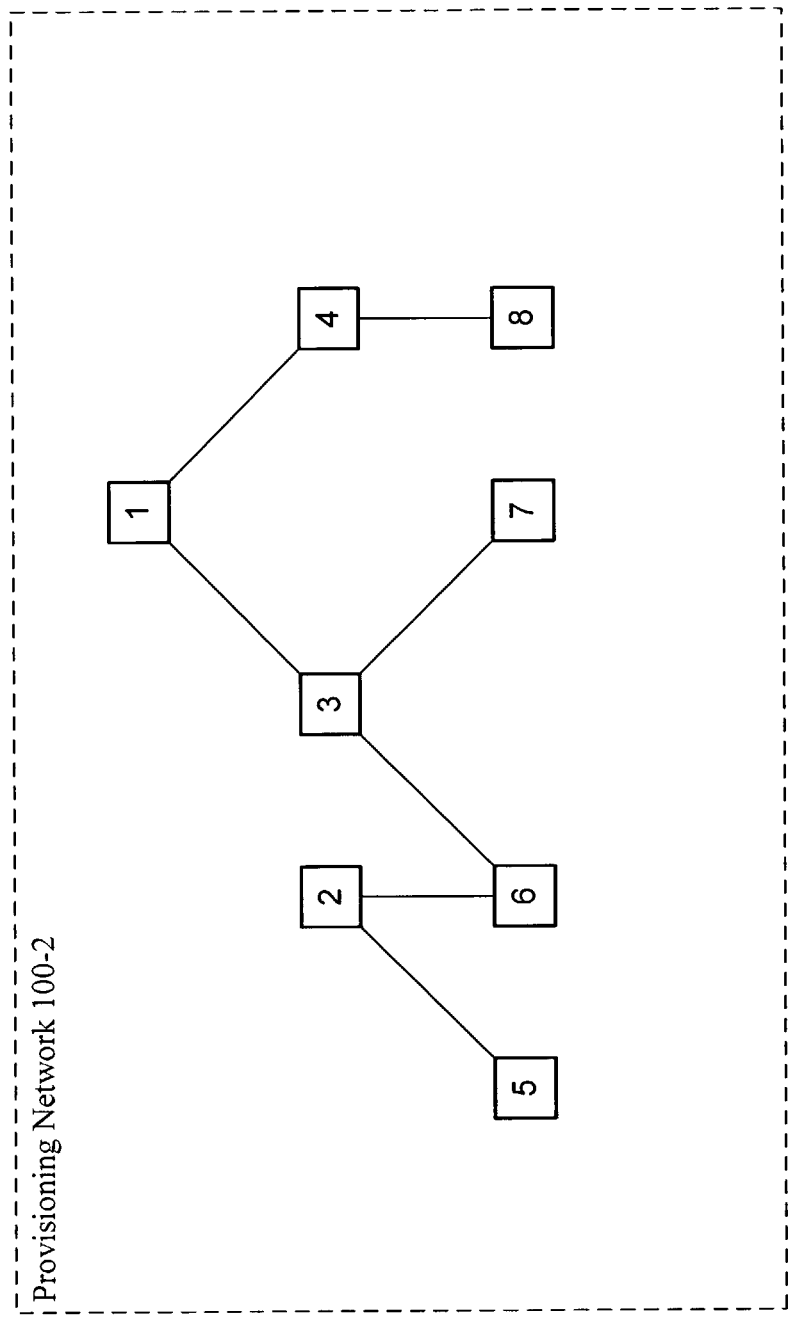
FIG. 3 depicts a graph of the topology of the provisioning network in accordance with the illustrative embodiment.

As depicted in FIG. 3, provisioning network 100-2 transports operations, administration, maintenance, and provisioning (i.e., "OAM&P") traffic to each node in telecommunications network 100. Therefore, provisioning network 100-2 is used to configure and control each node in transport network 100-1. For example, the administrator of telecommunications network 100 uses provisioning network 100-2 to send messages to the nodes in transport network 100-1 to provision or reprovision the resources of transport network 100-2 as desired. This includes the reprovisioning of resources in the event of the failure of a network element in transport network 100-1.

In accordance with the illustrative embodiment, provisioning network 100-2 uses the Internet Protocol, which is widely known as "IP." It will be clear to those skilled in the art, however, after reading this specification, how to make and use embodiments of the present invention in which provisioning network 100-2 uses one or more other protocols (e.g., Asynchronous Transfer Mode or "ATM," Multiprotocol Label Switching or "MPLS," etc.).

In accordance with the illustrative embodiment, provisioning network 100-2 is logically distinct from transport network 100-1, is at least partially physically distinct from transport network 100-1, and has a different topology than transport network 100-1. An example of a telecommunications network in which the transport network is at least partially distinct from the provisioning network is the POTS telephone network and concomitant SS-7 signaling network.

After reading this specification, however, it will be clear to those skilled in the art how to make and use embodiments of the present invention in which:

i. provisioning network 100-2 is logically unified with transport network 100-1, or ii. provisioning network 100-2 is physically unified with transport network 100-1, or iii. provisioning network 100-2 has the same topology as transport network 100-1, or iv. any combination of i, ii, and iii.

An example of a telecommunications network in which the transport network is logically and physically unified with the provisioning network is the Internet.

Figure 4:
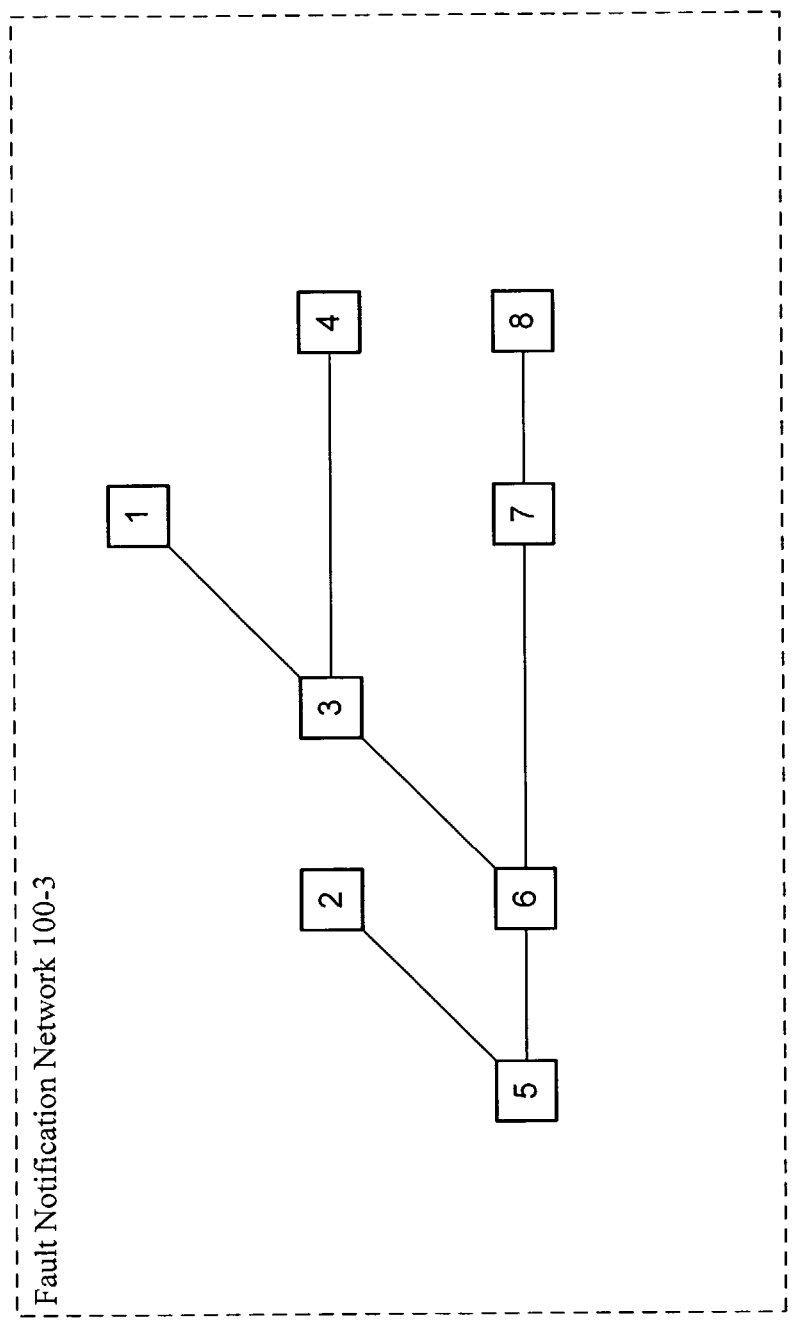
FIG. 4 depicts a graph of the topology of the fault notification network in accordance with the illustrative embodiment.

As depicted in FIG. 4, fault notification network 100-3 promulgates the information that a fault has occurred in transport network 100-1 to all of the other nodes in provisioning network 100-2 that need to be apprised of the existence and nature of the fault. This is described in detail below.

In accordance with the illustrative embodiment, fault notification network 100-3 uses the Automatic Protection Switching ("APS") channel of the SONET/SDH protocol. It will be clear to those skilled in the art, however, after reading this specification, how to make and use embodiments of the present invention in which fault notification network 100-3 uses one or more other protocols (e.g., the internet or "IP" protocol, asynchronous transfer mode or "ATM," etc.).

In accordance with the illustrative embodiment, fault notification network 100-3 is logically distinct from transport network 100-1, is at least partially physically distinct from transport network 100-1, and has a different topology than transport network 100-1. An example of a telecommunications network in which the transport network is at least partially distinct from the fault notification network is the POTS telephone network and concomitant SS-7 signaling network.

After reading this specification, however, it will be clear to those skilled in the art how to make and use embodiments of the present invention in which:

i. fault notification network 100-3 is logically unified with transport network 100-1, or ii. fault notification network 100-3 is physically unified with transport network 100-1, or iii. fault notification network 100-3 has the same topology as transport network 100-1, or iv. any combination of i, ii, and iii.

Furthermore, in accordance with the illustrative embodiment, fault notification network 100-3 is logically distinct from provisioning network 100-2, at least partially physically distinct from provisioning network 100-2, and has a different topology than provisioning network 100-2. After reading this specification, however, it will be clear to those skilled in the art how to make and use embodiments of the present invention in which:

i. fault notification network 100-3 is logically unified with provisioning network 100-2, or ii. fault notification network 100-3 is physically unified with provisioning network 100-2, or iii. fault notification network 100-3 has the same topology as provisioning network 100-2, or iv. any combination of i, ii, and iii.

To summarize, any of transport network 100-1, provisioning network 100-2, and fault notification network 100-3 can be logically unified or logically distinct from any other of transport network 100-1, provisioning network 100-2, and fault notification network 100-3. Furthermore, any of transport network 100-1, provisioning network 100-2, and fault notification network 100-3 can be physically unified, partially physically unified, or physically distinct from any other of transport network 100-1, provisioning network 100-2, and fault notification network 100-3. And still furthermore, any of transport network 100-1, provisioning network 100-2, and fault notification network 100-3 can has the same topology or a different topology from any other of transport network 100-1, provisioning network 100-2, and fault notification network 100-3.

An important idea underlying the present invention is the fact that transport network 100-1 has a dual character that enables fault restoration to occur quickly. First, transport network 100-1 has a mesh (i.e., non-ring) character. Second, and simultaneously, transport network 100-1 has a conjoined ring character. In other words, transport network 100-1 is considered both as a mesh and as a set of conjoined rings in a duality somewhat analogous to the wave-particle duality of matter. In other words, for some purposes, transport network 100-1 is treated and considered a mesh network and for some other purposes it is treated as a set of conjoined rings.

The topology of the mesh is quite simply the topology of transport network 100-1. The mesh defines an address space and each node in transport 100-1 has a unique address in the address space of the mesh. As shown in FIG. 3, transport network 100-1 comprises 8 nodes interconnected as shown. The mesh has, therefore, eight nodes and an address space of eight. The address of each of these 8 logical nodes in the address space of the mesh is arbitrarily chosen and is shown in Table 1.

TABLE 1

| Address of Physical Node in Address Space of Mesh ||
|---|---|
| Physical Node | Address in Address Space of Mesh |
| 1 | 1 |
| 2 | 2 |
| 3 | 3 |
| 4 | 4 |
| 5 | 5 |
| 6 | 6 |
| 7 | 7 |
| 8 | 8 |

Simultaneously, transport network 100-1 is a set of conjoined rings such that each node and each communications link in transport network 100-1 is in one or more ring networks. A mesh can usually be resolved into different sets of conjoined rings.

Figure 6:
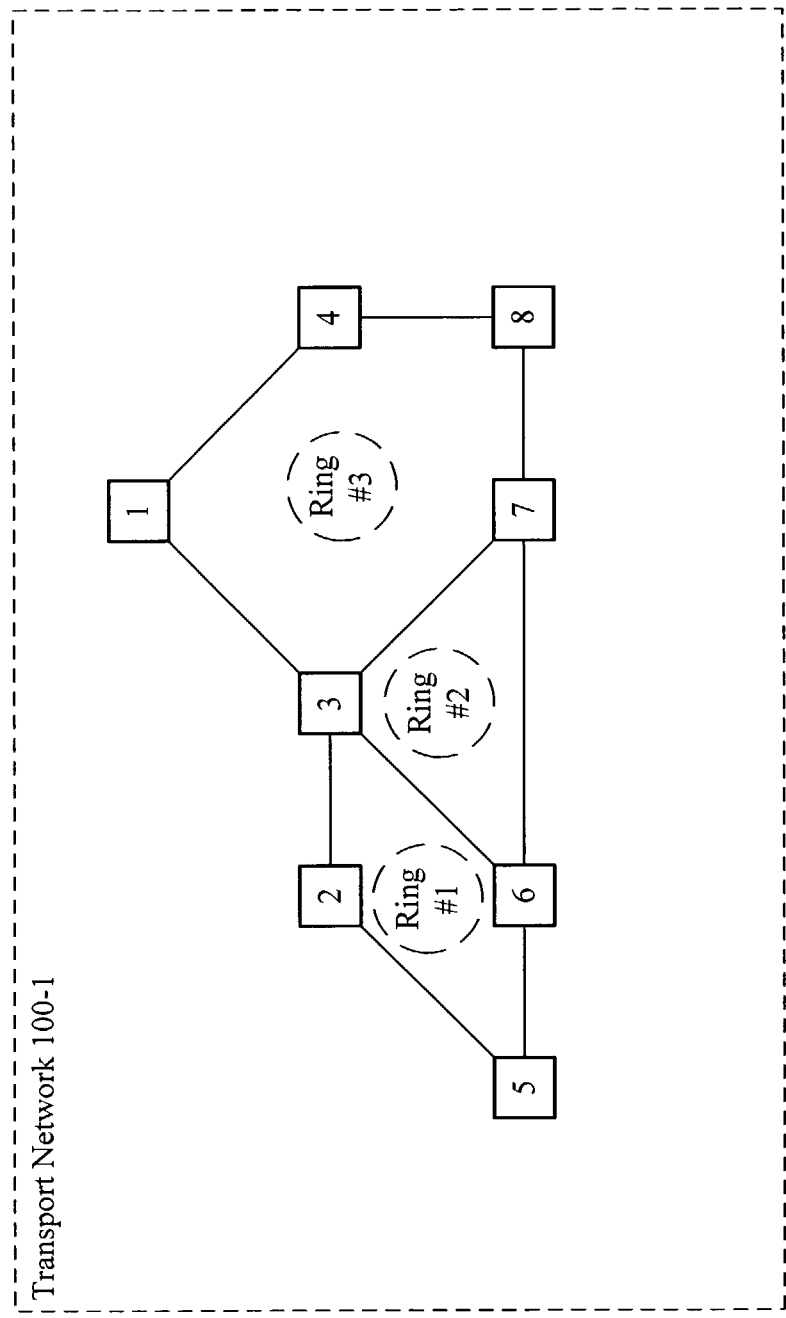
FIG. 6 depicts how transport network 100-1 is resolved into three conjoined ring networks.

For example, transport network 100-1 can be resolved into three conjoined ring networks as depicted in FIG. 6. Ring #1 comprises nodes 2, 3, 5, and 6 and the links interconnecting them. Ring #2 comprises nodes 3, 6, and 7 and the links interconnecting them. Ring #3 comprises nodes 1, 3, 4, and 7 and the links interconnecting them.

Figure 7:
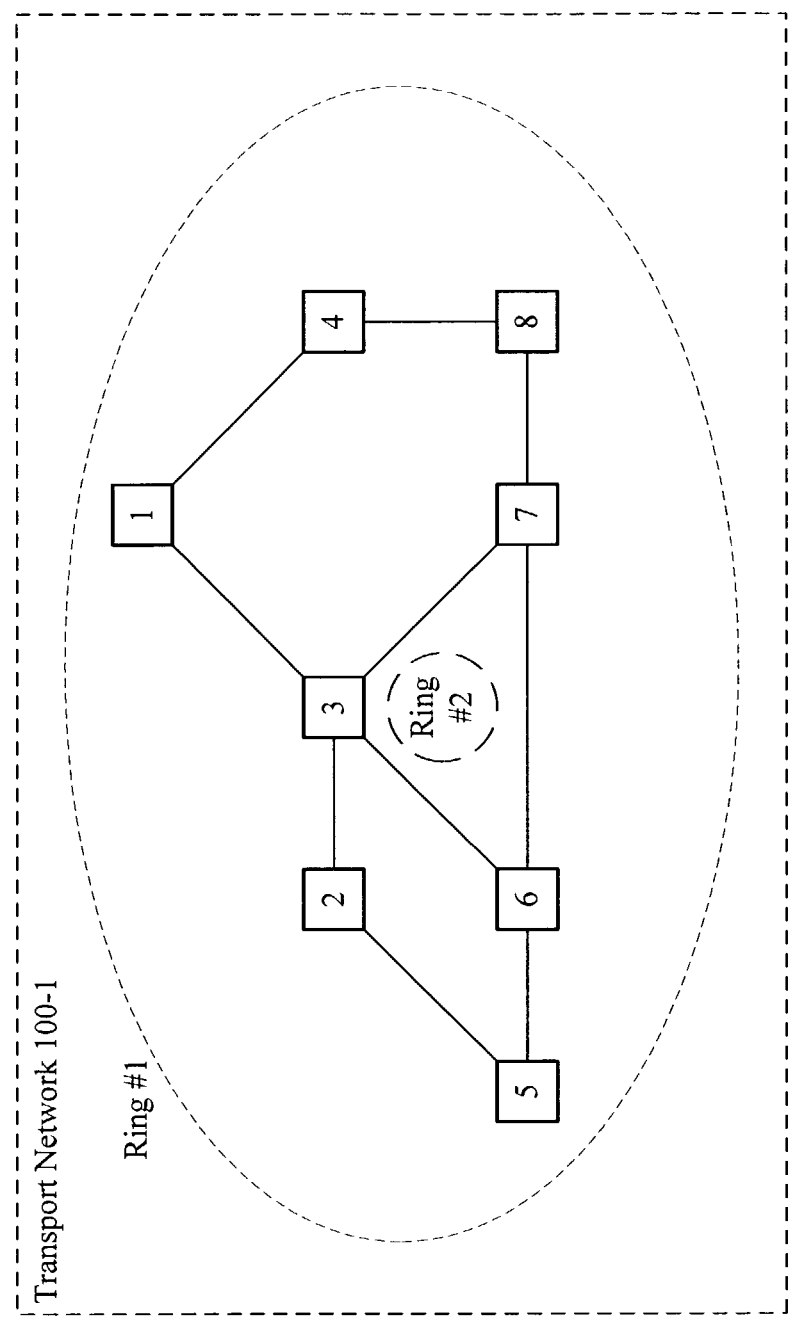
FIG. 7 depicts how transport network 100-1 is resolved into two conjoined ring networks.

Alternatively, transport network 100-1 can be resolved into two conjoined ring networks, as depicted in FIG. 7. In this case, ring #1 comprises all of the nodes in transport network 100-1 and all of the links interconnecting them except the link between node 3 and node 6 and the link between 3 and 7. Ring #2 comprises nodes 3, 6, and 7, and all the links interconnecting them.

Figure 8:
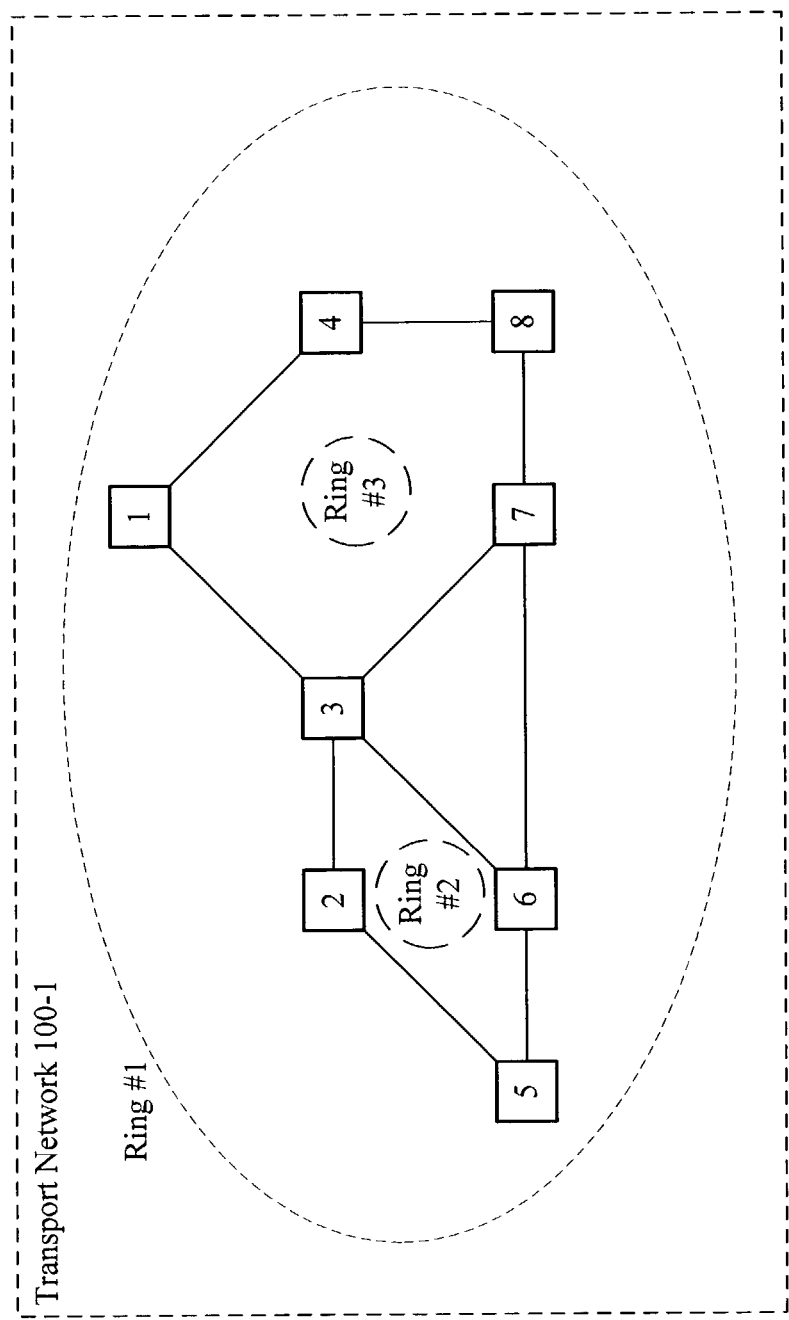
FIG. 8 depicts how transport network 100-1 is resolved into three conjoined ring networks in a different manner than in FIG. 6.

And as yet another alternative, transport network 100-1 can be resolved into three conjoined ring networks, as depicted in FIG. 8. In this case, ring #1 comprises all of the nodes in transport network 100-1 and all of the links interconnecting them except the link between node 3 and node 6 and the link between node 3 and node 7. Ring #2 comprises nodes 2, 3, 6, and 7 and the links interconnecting them. Ring #3 comprises nodes 1, 3, 4, and 7. It will be clear to those skilled in the art how to determine one or more sets of conjoined rings that are isomorphically identical to a mesh.

Each of the conjoined ring networks can be, but is not necessarily interlocked with each other, although each of the ring networks much be interlocked or conjoined with at least one of the other ring networks. Two ring networks are interlocked when they share at least one common node. When two ring networks are interlocked, a failure of a network element (i.e., a node or a communications link) in one ring network can, but does not necessarily, alter some aspect of the operation of the second ring network. This is in marked contrast to dual-ring interworking ("DRI") in which the failure of a network element in one ring does not affect the operation of a second ring network.

Two or more interlocked ring networks are conjoined at one or more "ring interworking nodes." A ring interworking node is a node in two or more interlocking ring networks that:

i. can transfer traffic between one ring and another ring during normal operation, and ii. can initiate or terminate the transfer of traffic between one ring and a second ring based on the failure of a network element in either ring.

When a set of conjoined rings has been determined, the bandwidth resources of transport network 100-1 are assigned to one or more of the rings. The bandwidth on a link can be divided equally or not equally between the rings sharing that link. When a node is only in one ring, that node is assigned to that ring. Similarly, when a link is only in one ring, that link is assigned to that ring. In contrast, when a node is in two or more rings, the bandwidth of that node is apportioned to each ring. Similarly, when a link is in two or more rings, the bandwidth of that link is apportioned to each ring. The overall result is that the bandwidth of the mesh is equivalent to the bandwidth of the set of conjoined rings.

When a protected service is provisioned through the mesh network, both the service and the protection bandwidth are provisioned through transport network 100-1 as if the service and the protection bandwidth were provisioned through one ring network or through a series of two or more interlocking ring networks. This is the trick that confines the magnitude of—and the scope of—a disruption of a fault in transport network 100-1 so that fault restoration can occur quickly.

When a protected service is provisioned through only one ring network, both the service bandwidth and the protection bandwidth are provisioned in well-known fashion. In this case, the failure of one or more of the network elements supporting the service is detected in well-known fashion, promulgated to the relevant nodes in provisioning network 100-2 via fault notification network 100-3, and handled by provisioning network 100-2 on a ring-by-ring basis. In other words, the notice of a failure of one or more of the network elements in a ring supporting a service is promulgated by fault notification network 100-3 to those nodes in provisioning network 100-2 responsible for controlling the nodes in that ring.

In contrast, when a protected service is provisioned through two or more interlocking rings, both service bandwidth and protection bandwidth are provisioned in each ring and in the conduits between the applicable rings. Whenever the service bandwidth passes between two rings, its passes at a ring interworking node called a "primary transfer node." Whenever the protection bandwidth passes between two rings, it passes at a ring interworking node called a "secondary transfer node." A primary transfer node and a secondary transfer node are relative designations that are given on a service by service basis, and, therefore, one node can be both a primary transfer node for one service and a secondary transfer node for another service.

When a protected service is provisioned through a primary transfer node, the failure of any network element other than the primary transfer node is detected, promulgated, and handled in the same manner as a failure of a single ring. In other words, the conjoined ring character of transport network 100-1 enables a failure not involving the primary transfer node to be restored in the same manner as a fault of a single ring.

In contrast, when a primary transfer node fails, the fault is reported by fault notification network as a fault in both rings associated with the primary transfer node to provisioning network 100-2. In the illustrative embodiment, a node is only notified of a fault in a ring when that node is part of that ring. Provisioning network 100-2 then handles the restoration of the resources in both rings, except the secondary transfer node, as isolated faults. The secondary transfer node is, however, provisioned to re-route the service between the two rings and around the failed primary transfer node. Again, this restoration is handled on a service-by-service basis.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A telecommunications system comprising:
   a mesh transport network to transport payload traffic, the mesh transport network comprising a plurality of nodes and a plurality of physical communications links coupled between at least some of the nodes, wherein each of said plurality of communications links is associated with at least one ring network, wherein the mesh transport network defines an address space and each of the plurality of nodes has a unique address in the address space;
   a provisioning network to transport operations, administration, maintenance, and provisioning (OAM&P) traffic among the plurality of nodes, wherein the provisioning network is logically distinct from the mesh transport network so that during normal operation the provisioning network is configured to transport the OAM&P traffic on a logical path that is different from a logical path of the payload traffic; and
   a fault notification network to transport fault information among the plurality of nodes, wherein the fault notification network is logically distinct from the mesh transport network and from the provisioning network so that the fault notification network is configured to transport the fault information on a logical path that is different from the logical path of the payload traffic and the OAM&P traffic, wherein the fault information conveys the existence and nature of the fault.

* * * * *